United States Patent
Ono et al.

(10) Patent No.: US 7,589,763 B2
(45) Date of Patent: Sep. 15, 2009

(54) FLICKER CORRECTION METHOD AND DEVICE, AND IMAGING DEVICE

(75) Inventors: Noriyuki Ono, Kanagawa (JP); Motohiro Nakasuji, Kanagawa (JP); Yoshiaki Nishide, Kanagawa (JP); Hiromasa Ikeyama, Tokyo (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 11/376,345

(22) Filed: Mar. 16, 2006

(65) Prior Publication Data

US 2006/0232687 A1 Oct. 19, 2006

(30) Foreign Application Priority Data

Apr. 19, 2005 (JP) .............................. 2005-121425

(51) Int. Cl.
*H04N 9/73* (2006.01)
*H04N 5/335* (2006.01)
*H04N 5/222* (2006.01)

(52) U.S. Cl. .................... 348/226.1; 348/294; 348/370
(58) Field of Classification Search .............. 348/226.1, 348/227.1, 229, 627, 294, 370, 607
See application file for complete search history.

(56) References Cited

U.S. PATENT DOCUMENTS 5,293,225 A * 3/1994 Nishiyama et al. .......... 348/242
5,822,008 A * 10/1998 Inoue et al. .................. 348/446
5,892,551 A * 4/1999 Uematsu ...................... 348/447
6,275,307 B1* 8/2001 Segawa ........................ 358/446
7,471,343 B2* 12/2008 Murai et al. ................. 348/700
7,502,054 B2* 3/2009 Kalapathy et al. ......... 348/226.1
2004/0012692 A1* 1/2004 Arazaki .................... 348/226.1
2004/0165084 A1* 8/2004 Yamamoto et al. ........ 348/226.1
2005/0046704 A1* 3/2005 Kinoshita ................. 348/226.1
2005/0157203 A1* 7/2005 Nakakuki et al. ........... 348/362
2005/0206745 A1* 9/2005 Daiku et al. .............. 348/226.1

FOREIGN PATENT DOCUMENTS

EP  1 566 962 A1  8/2005
JP  11313226 A  * 11/1999
JP  2004-222228  8/2004

* cited by examiner

*Primary Examiner*—Nhan T Tran
*Assistant Examiner*—Trung Diep
(74) *Attorney, Agent, or Firm*—Oblon, Spivak, McClelland, Maier & Neustadt, P.C.

(57) ABSTRACT

A flicker is corrected with consideration given to the influence of noises. The present invention provides a flicker correction method in which a flicker is corrected by subtracting a flicker correction signal from an image signal, the method including the steps of removing noise from the flicker-corrected image signal by passing the latter through a low-pass filter, generating a correction error signal from the noise-removed, flicker-corrected image signal and the image signal not yet flicker-corrected, removing the image signal not yet flicker-corrected by passing the latter through a low-pass filter, and generating a flicker correction signal from the noise-removed image signal and correction error signal.

15 Claims, 10 Drawing Sheets

Flicker image when image sensor is of global shutter type

Flicker image when image sensor is of rolling shutter type

FLICKER CORRECTION METHOD AND DEVICE, AND IMAGING DEVICE

CROSS REFERENCES TO RELATED APPLICATIONS

The present invention contains subject matter related to Japanese Patent Application JP 2005-121425 filed in the Japanese Patent Office on Apr. 19, 2005, the entire content of which is incorporated herein by reference.

BACKGROUND OF THE INVENTION

1. Field of the Invention

The present invention relates to a flicker correction method and device, and an image pickup device, in which a flicker is corrected by subtracting a flicker correction signal from an image signal.

2. Description of the Related Art

When an object is imaged with a digital camera under the light of a light source that repeats turning on and off cyclically, such as a fluorescent lamp, cyclic light and dark fringes will appear in a captured image of the object, resulting in that they will seemingly run in the image. Otherwise, there will cyclically take place a difference in brightness between frames over an image. This is called "flicker". The flicker is a problem unavoidably taking place when an object is imaged with a digital camera using an image sensor to image the object under the light of a flickering light source with the timing of charge storage being shifted.

In the conventional image sensor, the timing of charge storage varies depending upon whether the charge storage is made per plane or per line. Generally, timing of the charge storage per plane is called "global shutter system" while timing of the charge storage per line is called "rolling shutter system". Most of the CCDs have adopted an image sensor of the global shutter type in the past. Recently, however, increasingly more attention has been paid to the CMOS image sensors that consume less power than the CCDs and can be produced more inexpensively than the CCDs because of their smaller number of parts. Many of the CMOS image sensors adopt the rolling shutter system for their structural problem. With one of the two shutter systems, when imaging is made under the light of a light source repeating turning on and off, light and dark fringes will appear in an entire image plane (plane flicker), while with the other shutter system, light and dark fringes will appear per line (in-plane flicker).

FIG. 1 shows a difference in amount of charge storage in an image sensor adopting the global shutter system, and FIG. 2 shows an example of image incurring a plane flicker when the image sensor is of the global shutter type. FIG. 3 shows a difference in amount of charge storage in an image sensor adopting the rolling shutter system, and FIG. 4 shows an example of image incurring an in-plane flicker. Also, a flicker component included in an image captured under the light of a light source cyclically turning on and off can be approximated to a sinusoidal wave, and there has been prevalent the method of forming a corrected image by removing the flicker on the basis of the nature of the sinusoidal wave.

For the flicker correction, there was proposed a method in which a flicker component is detected in an input image and the gain on the basis of a flicker component detected in an input image (as in the Japanese Patent Application Laid Open No. 2004-222228).

SUMMARY OF THE INVENTION

Note here that the conventional method in which a flicker component is detected in an input image and the gain is controlled based on the detected flicker component is not advantageous in that the gain of a noise component will also be increased with the result that the noise will be enhanced in a segment of the input image signal, of which the gain is increased for correction of the flicker. Simulation of the noise enhancement will be described below with reference to FIG. 5.

Also, the method in which the level of flicker correction value is adjusted simply based on an input signal cannot be said to attain a high accuracy of correction because the noise included in the input signal will adversely affect the correction value. The flicker level is very low as compared with the noise. Therefore, the flicker correction has to be made with consideration given to the large influence of the noises.

It is therefore desirable to overcome the above-mentioned drawbacks of the related art by providing a flicker correction method and device, and an image pickup device, in which a flicker can be corrected with consideration given to the influence of noises.

According to the present invention, there is provided a flicker correction method in which a flicker is corrected by subtracting a flicker correction signal from an image signal, the method including the steps of removing noise from the flicker-corrected image signal by passing the latter through a low-pass filter, generating a correction error signal from the noise-removed, flicker-corrected image signal and the image signal not yet flicker-corrected, removing the image signal not yet flicker-corrected by passing the latter through a low-pass filter, and generating a flicker correction signal from the noise-removed image signal and correction error signal.

According to the present invention, there is also provided a flicker correction device in which a flicker is corrected by subtracting a flicker correction signal from an image signal, the device including a correction error detecting means for removing noise from the flicker-corrected image signal by passing the latter through a low-pass filter and generating a correction error signal from the noise-removed, flicker-corrected image signal and the image signal not yet flicker-corrected, and a flicker correcting means for removing the image signal not yet flicker-corrected by passing the latter through a low-pass filter and generating a flicker correction signal from the noise-removed image signal and correction error signal.

According to the present invention, there is also provided an image pickup device including a flicker correction device in which a flicker is corrected by subtracting a flicker correction signal from an image signal captured by an image sensing means, the flicker correction device including a correction error detecting means for removing noise from the flicker-corrected image signal by passing the latter through a low-pass filter and generating a correction error signal from the noise-removed, flicker-corrected image signal and the image signal not yet flicker-corrected, and a flicker correcting means for removing the image signal not yet flicker-corrected by passing the latter through a low-pass filter and generating a flicker correction signal from the noise-removed image signal and correction error signal.

According to the present invention, the flicker level is adjusted based on an input signal from which noise has been removed by passing through a low-pass filter. Thus, a flicker can be corrected under no influence of the noise. Also, when a correction error is detected, a flicker-added signal can be generated which is not under the influence of the noise. Thus, correction error can be detected with a high accuracy.

Therefore, the present invention permits to make flicker correction with reduced influence of noise.

DETAILED DESCRIPTION OF THE PREFERRED EMBODIMENTS

The present invention will be described in detail below concerning the embodiments thereon with reference to the accompanying drawings. It should be noted that the present invention is not limited to the embodiments which will be described herebelow but it may be can be modified in various manners, constructed alternatively or embodied in various other forms without departing from the scope and spirit thereof.

Figure 1:
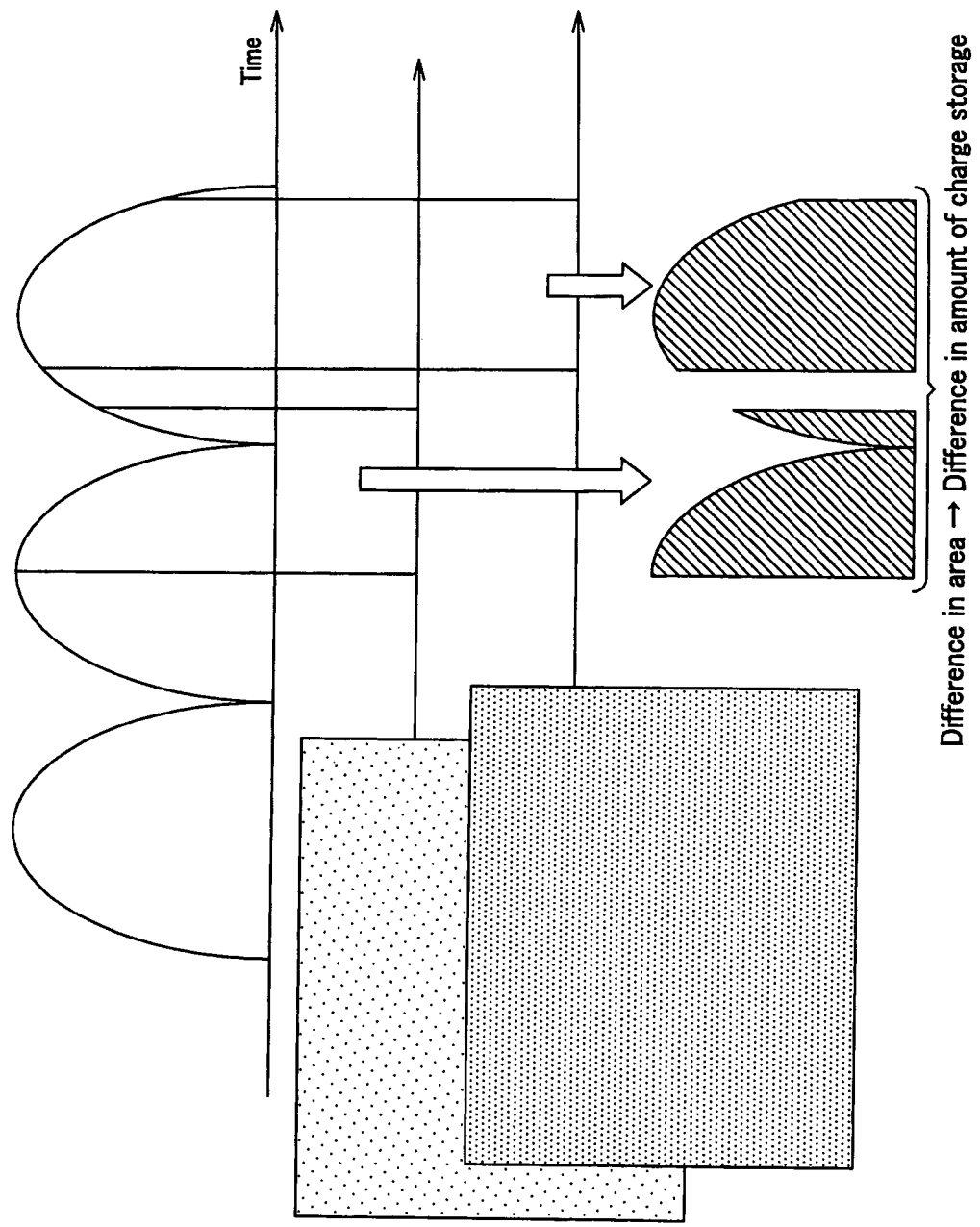
FIG. 1 schematically illustrates a difference in amount of charge storage in an image sensor of the global shutter type.
Figure 2:
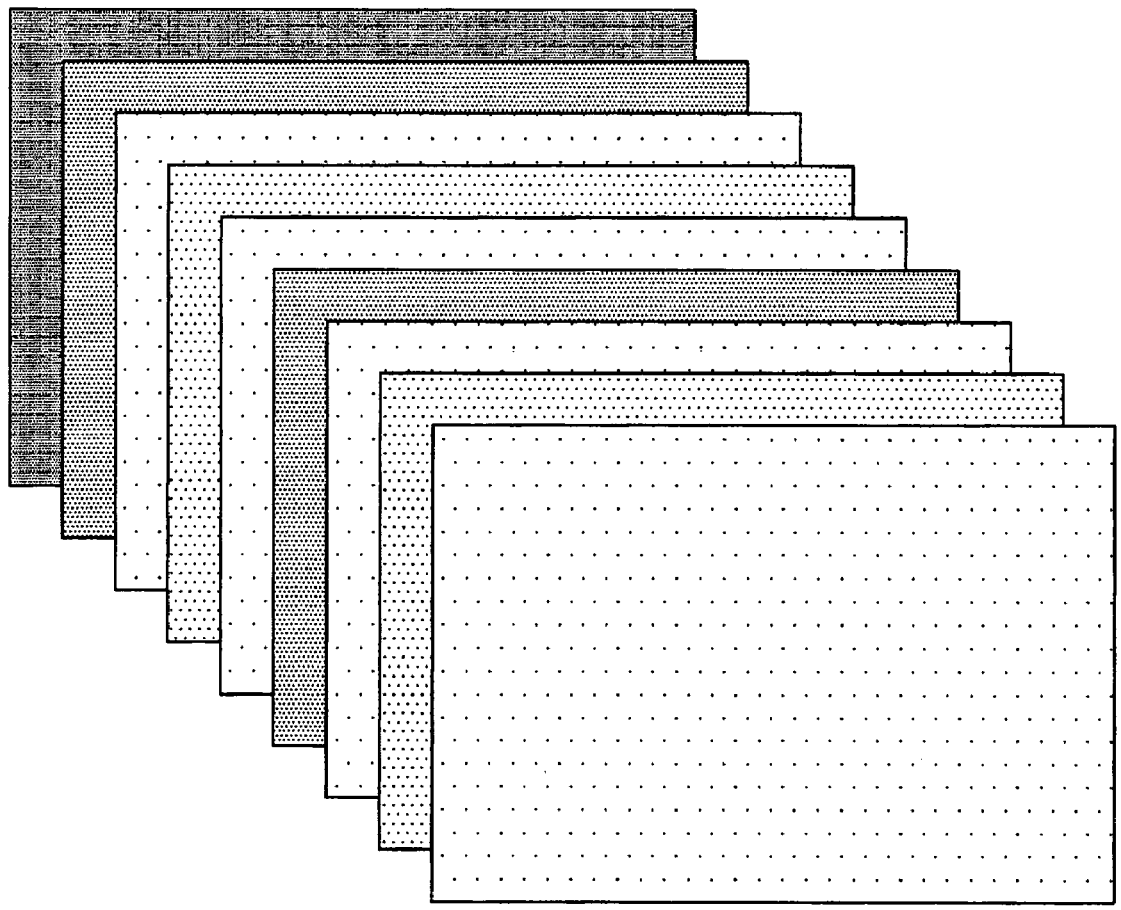
FIG. 2 schematically illustrates an example of plane flicker image appearing when the global shutter system is adopted.
Figure 3:
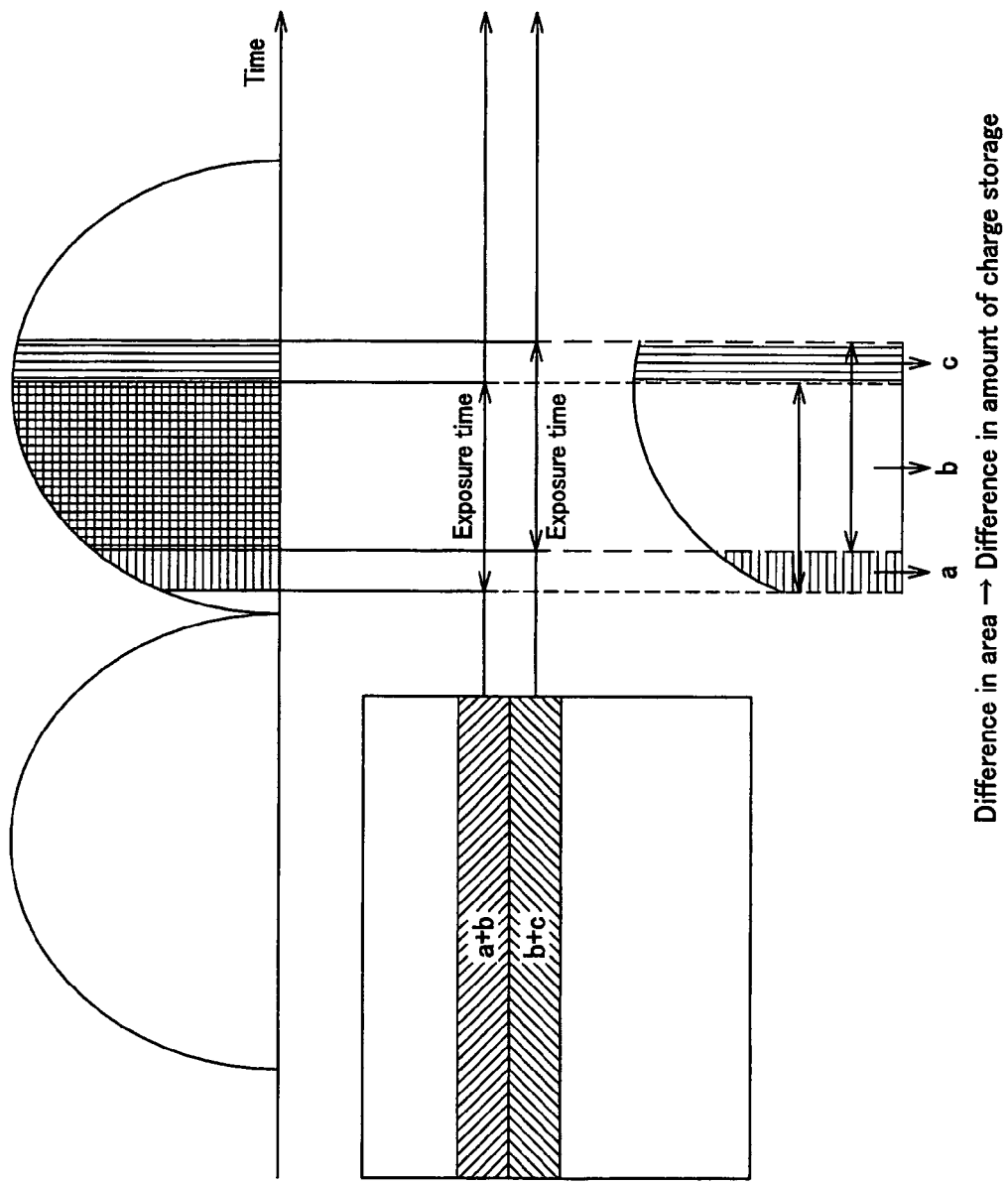
FIG. 3 schematically illustrates a difference in amount of charge storage in an image sensor of the rolling shutter type.
Figure 4:
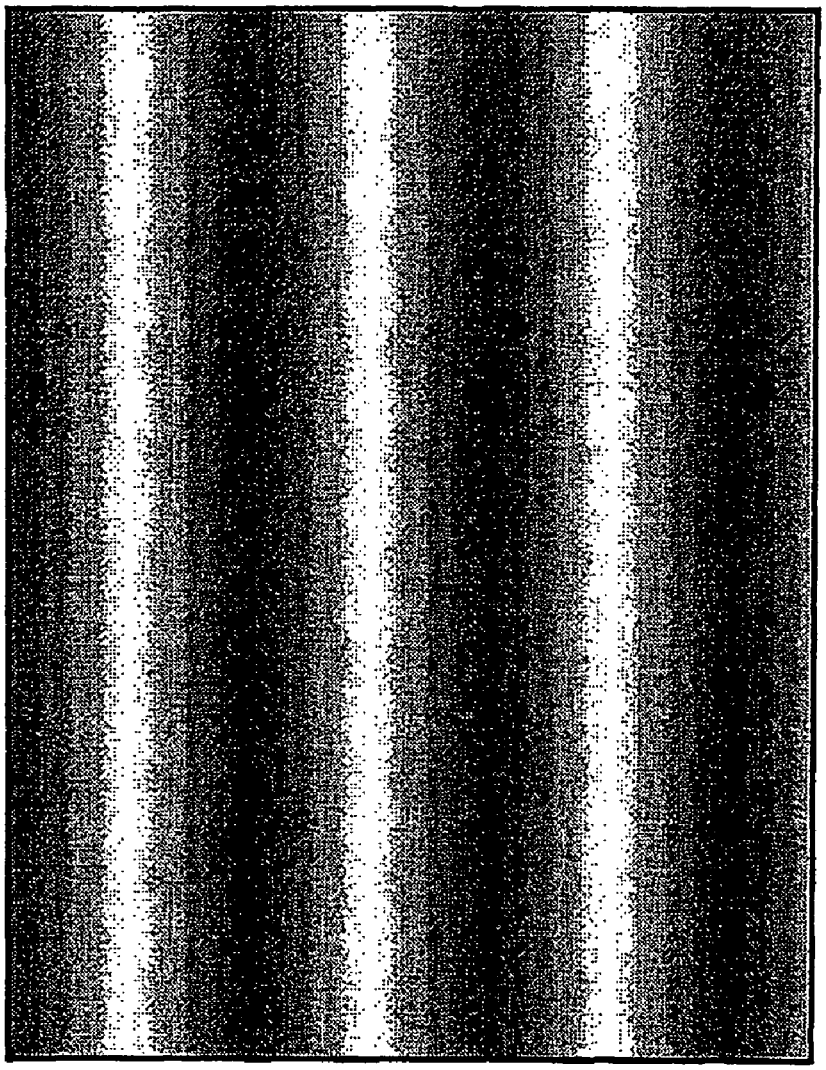
FIG. 4 schematically illustrates an example of in-plane flicker image.
Figure 5:
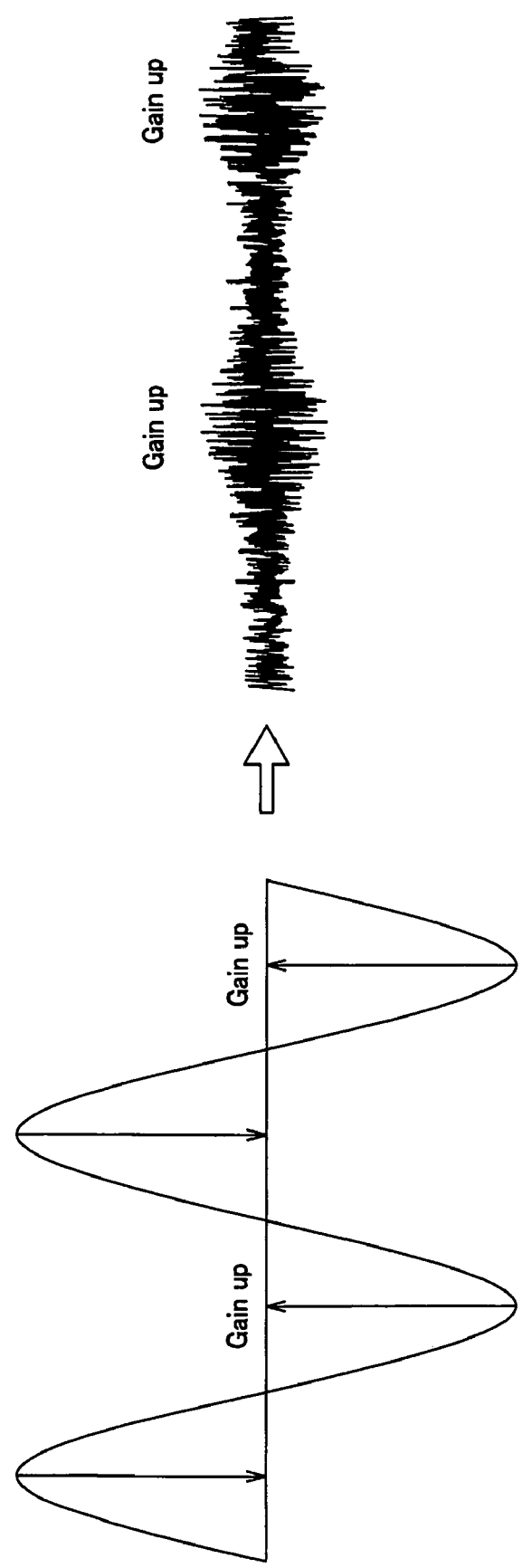
FIG. 5 schematically illustrates the result of simulation of an enhanced noise in the conventional method in which a flicker component is detected in an input image and gain is adjusted based on the detected flicker component.
Figure 6:
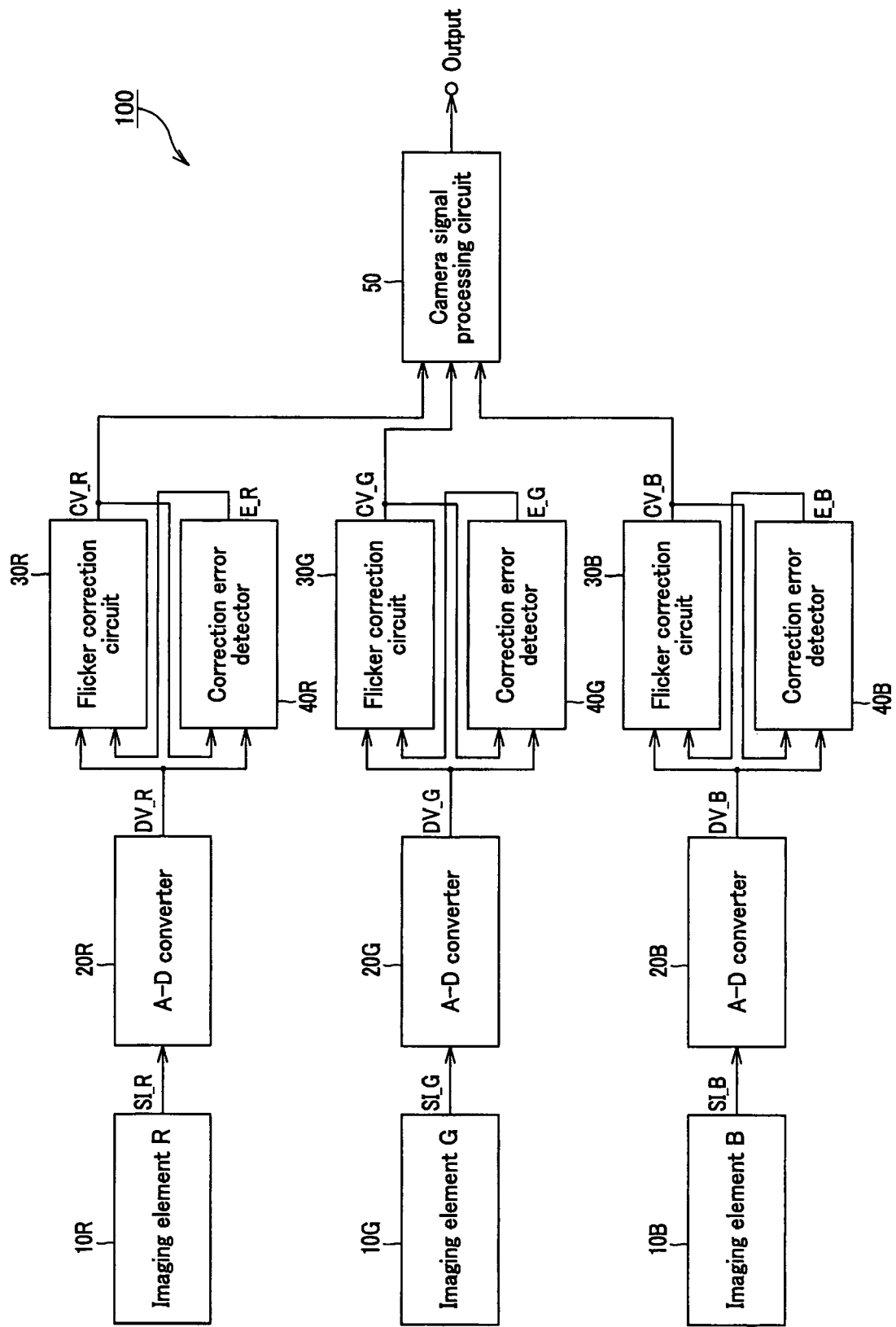
FIG. 6 is a schematic block diagram of an image pickup device as one embodiment of the present invention.

The present invention is applicable to an image pickup device constructed as shown in FIG. 6. The image pickup device is generally indicated with a reference numeral 100.

The image pickup device 100 includes a red color image sensing device (imaging element) 10R, green color image sensing device (imaging element) 10G, blue color image sensing device (imaging element) 10B, A-D converters 20R, 20G and 20B to digitize image signals SI_R, SI_G and SI_B of color images captured by the image sensing devices 10R, 10G and 10B, respectively, flicker correction circuits 30R, 30G and 30B and correction error detectors 40R, 40G and 40B, supplied with the image signals DV_R, DV_G and DV_B digitized by the A-D converters 20R, 20G and 20B, respectively, camera signal processing circuit 50 supplied with image signals CV_R, CV_G and CV_B flicker-corrected by the flicker correction circuits 30R, 30G and 30B, respectively, etc.

Supplied with the image signals CV_R, CV_G and CV_B flicker-corrected by the flicker correction circuits 30R, 30G and 30B, respectively, the correction error detectors 40R, 40G and 40B detect correction errors of the image signals CV_R, CV_G and CV_B in the digitized image signals DV_R, DV_G and DV_B and flicker-corrected image signals CV_R, CV_G and CV_B to generate correction error signals E_R, E_G and E_B, and supply the generated correction error signals E_R, E_G and E_B to the flicker correction circuits 30R, 30G and 30B, respectively.

Figure 7:
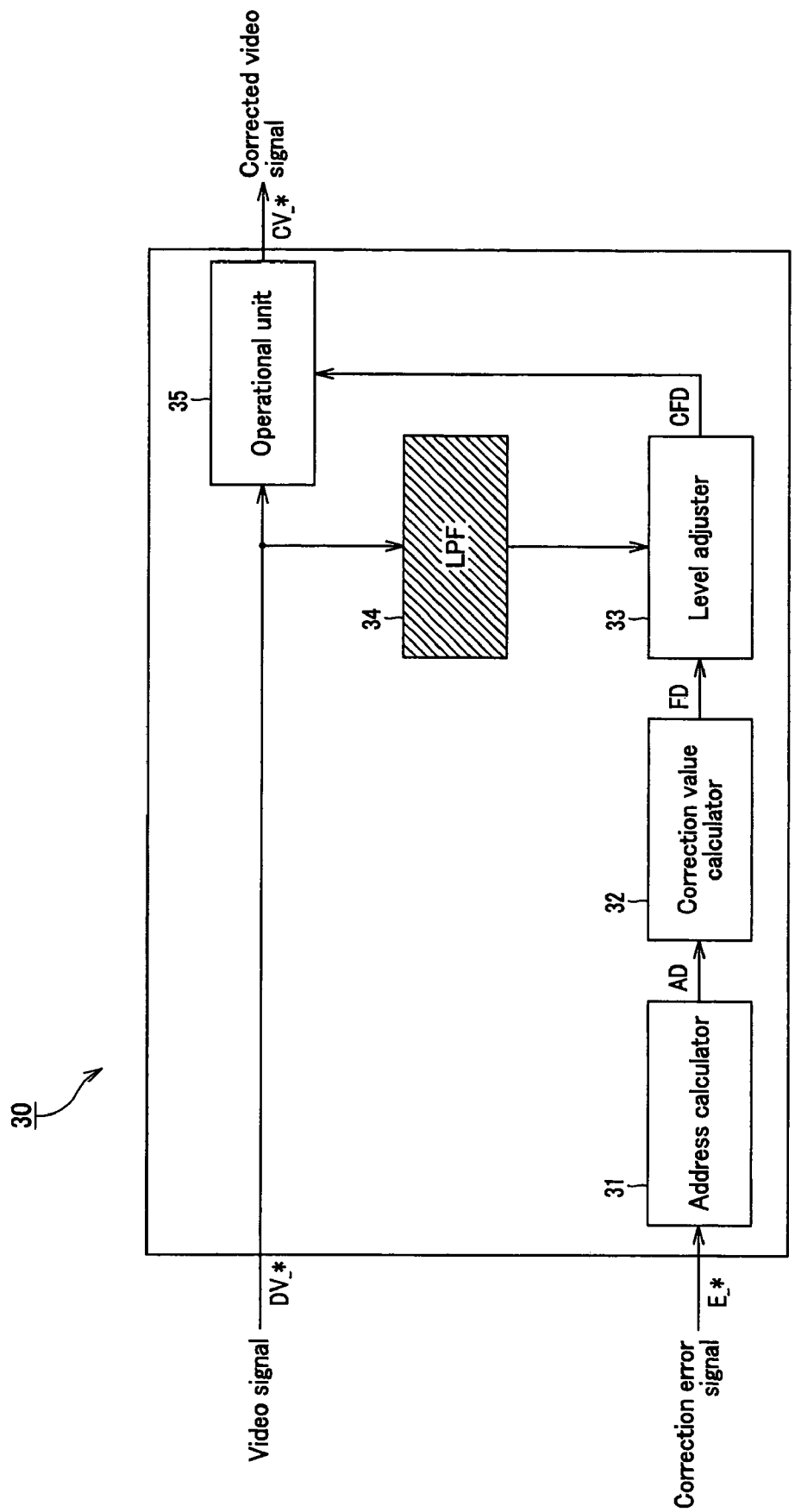
FIG. 7 is also a schematic block diagram of a flicker correction circuit included in the image pickup device shown in FIG. 6.

In the image pickup device 100, each of the flicker correction circuits 30R, 30G and 30B uses a flicker correction circuit 30* constructed as shown in FIG. 7. It should be noted here that the asterisk (*) stands for "R (red)", "G (green)" and "B (blue)".

The flicker correction circuit 30* includes an address calculator 31* supplied with a correction error signal E_* from the correction error detector 40*, correction value calculator 32* supplied with an address AD calculated by the address calculator 31*, level adjuster 33* supplied with flicker correction data FD calculated by the correction value calculator 32*, low-pass filter (LPF) 34* and an operational circuit 35* supplied with an image signal DV_* digitized by the A-D converter 20*. The image signal DV_* digitized by the A-D converter 20* is supplied, via the low-pass filter 34*, to the level adjuster 33* that will then generate a flicker correction value CFD which is to be supplied to the operational circuit 35*.

In the flicker correction circuit 30* constructed as above, the address calculator 31* calculates an address AD in ROMs (flicker memories 321 and 322 which will further be described in detail later) included in the correction value calculator 32* on the basis of the correction error signal E_* supplied from the correction error detector 40*.

The address calculator 31* calculates the address of a present line by calculating the address of a first line in a frame of interest from a power supply frequency and frame rate, and calculating an address increment at each advance by one line toward the address. More specifically, in case the power supply frequency is 50 Hz, frame rate is 30 Hz and the number of vertical clocks of the image sensing device 10* is 1125 clk (these power supply frequency, frame rate and number of clocks of the image sensing device 10* remain unchanged through the following description), the period T between light and dark fringes of a flicker will contain 337.5 lines as given below by an equation 1:

$$T = 30\,\text{Hz} \times 1125\,\text{clk}/(50\,\text{Hz} \times 2) = 337.5\,(\text{clk}) \quad (1)$$

Also, the ROM in the system holds flicker data resulted from division of one period by 512. At each advance by one line, the address in the ROM will be incremented by about 1.51703 as given below by an equation 2:

$$512/337.5 = 1.51703 \quad (2)$$

That is, on the assumption that the correction wave address on the first line is zero (0), the address on the 100th line counted from the first line will be 152 as given below by an equation 3:

$$0 + 1.51703 \times 100 \approx 152 \quad (3)$$

Figure 8:
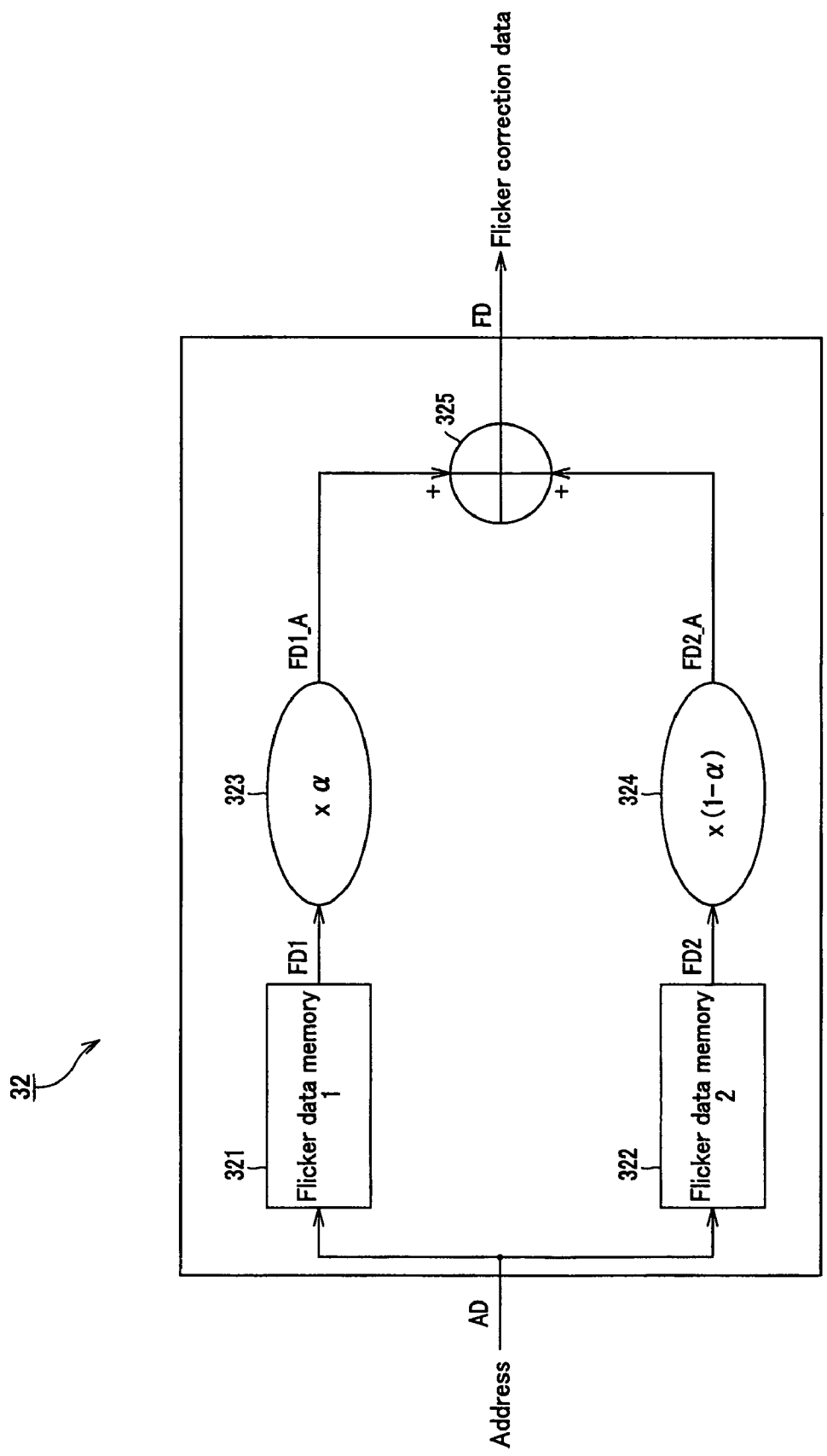
FIG. 8 is a schematic block diagram of a correction value calculator in the flicker correction circuit.

As shown in FIG. 8, the correction value calculator 32* includes flicker memories 321 and 322, multipliers 323 and 324 to multiply two types of flicker data FD1 and FD2 read from the flicker memories 321 and 322 by coefficients α and α-1, respectively, and an adder 325 supplied with flicker data FD1_A and FD2_A multiplied by the coefficients α and α-1, respectively, by the multipliers 323 and 324, respectively. The two types of flicker data FD1 and FD2 will be read from the flicker memories 321 and 322, respectively, according to the address AD calculated by the address calculator 31*.

The correction value calculator 32* reads the two types of flicker data FD1 and FD2 from the flicker memories 321 and 322, respectively, on the basis of the address AD calculated by the address calculator 31*, multiplies the flicker data FD1 and FD2 by the coefficients α and α-1, respectively, by the multipliers 323 and 324, respectively, correspondingly to a frame rate and shutter speed, and adds the results together by the adder 325, to thereby calculate one flicker correction data FD.

Note that the periodicity of the flicker data is utilized, the correction value calculator 32* is to hold a part of waveforms of the flicker data FD1 and FD2. Also, flicker data can appropriately be calculated even with any other memory than the ROM. In this embodiment, one flicker correction data FD is synthesized by combining the two flicker data FD1 and FD2 together. However, three or more flicker data can be combined together to synthesize various flicker correction data FD. The flicker correction data FD is updated once by a value depending upon each line per line.

Since the flicker level varies depending upon the brightness of each pixel, it is adjusted per pixel using the input image signal DV_*. However, the image signal DV_* contains a noise component which will influence the level adjustment.

On this account, the flicker correction circuit 30* in the image pickup device 100 removes the noise from the image signal DV_* by passing the latter through the low-pass filter (LPF) 34* and supplies the noise-removed image signal DV_*' to the level adjuster 33*. The level adjuster 33* can calculate a correction value CFD for each pixel which is not under the influence of the noise from the noise-removed image signal DV_*' and flicker correction data FD calculated by the correction value calculator 32*.

Note that this embodiment is adapted so that the correction value monotonously increases correspondingly to a pixel value for there has been observed a tendency that the flicker level also increases linearly correspondingly to a pixel value. Also, since no flicker is observed when the pixel value is extremely small or large, the embodiment is adapted to make a calculation taking this feature in account. However, the present invention is not limited to this embodiment.

In the flicker correction circuit 30*, the adder 35* adds the correction value CFD for each pixel to the image signal DV_* to provide a corrected image signal CV_*.

Figure 9:
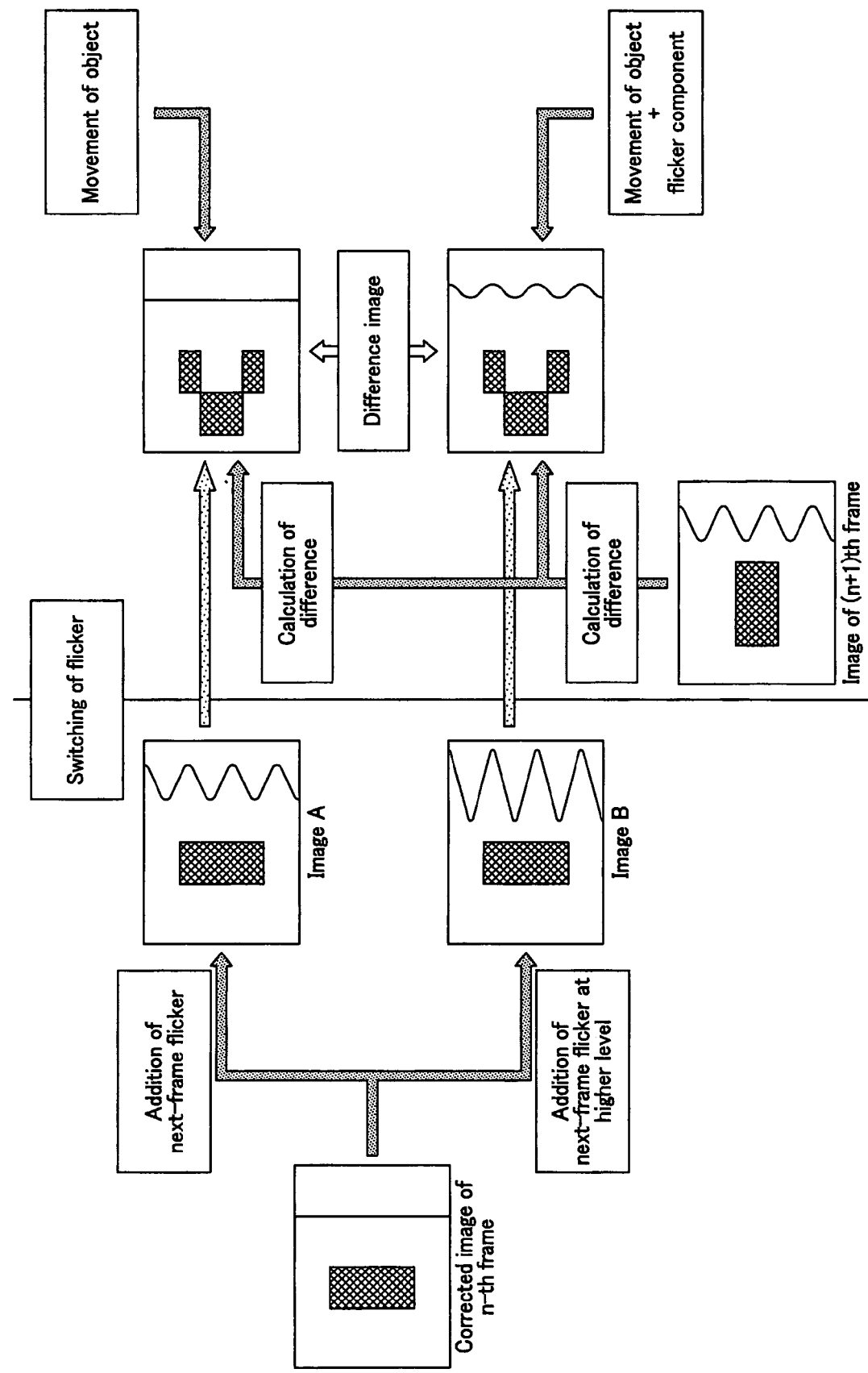
FIG. 9 schematically illustrates an algorithm for correction error detection in the image pickup device.

In this image pickup device 100, each of the correction error detectors 40R, 40G and 40B detects a correction error using an algorithm shown in FIG. 9.

More specifically, after "corrected image of n-th frame" is outputted, a flicker state of the (n+1)th frame is predicted from the "correction image of n-th frame" and a flicker component is added to the "correction image of n-th frame". An image thus resulted will be referred to herein as "image A" hereunder. Also, a flicker state of the (n+1)th frame is predicted and a flicker component has the address thereof shifted is added to the (n+1)th frame. An image thus resulted will be referred to as "image B" hereunder. A difference is calculated between these two images A and B and the "correction image of n-th frame" including the flicker component. Concerning the "image A", only movement of an object is outputted as a difference image. Concerning the "image B", both the movement of the object and flicker component are outputted as difference images. As will be seen from comparison between these differences, the difference of the "image A" is smaller. On the contrary, it can be considered that in case the difference determined from the "image B" is smaller than that of the "image A", a flicker having the address thereof shifted can be predicted correctly. That is to say, a smaller difference means that a flicker has correctly been predicted. Thus, shifting the flicker address for a smaller difference can end up with a correction error limited within a certain range.

Figure 10:
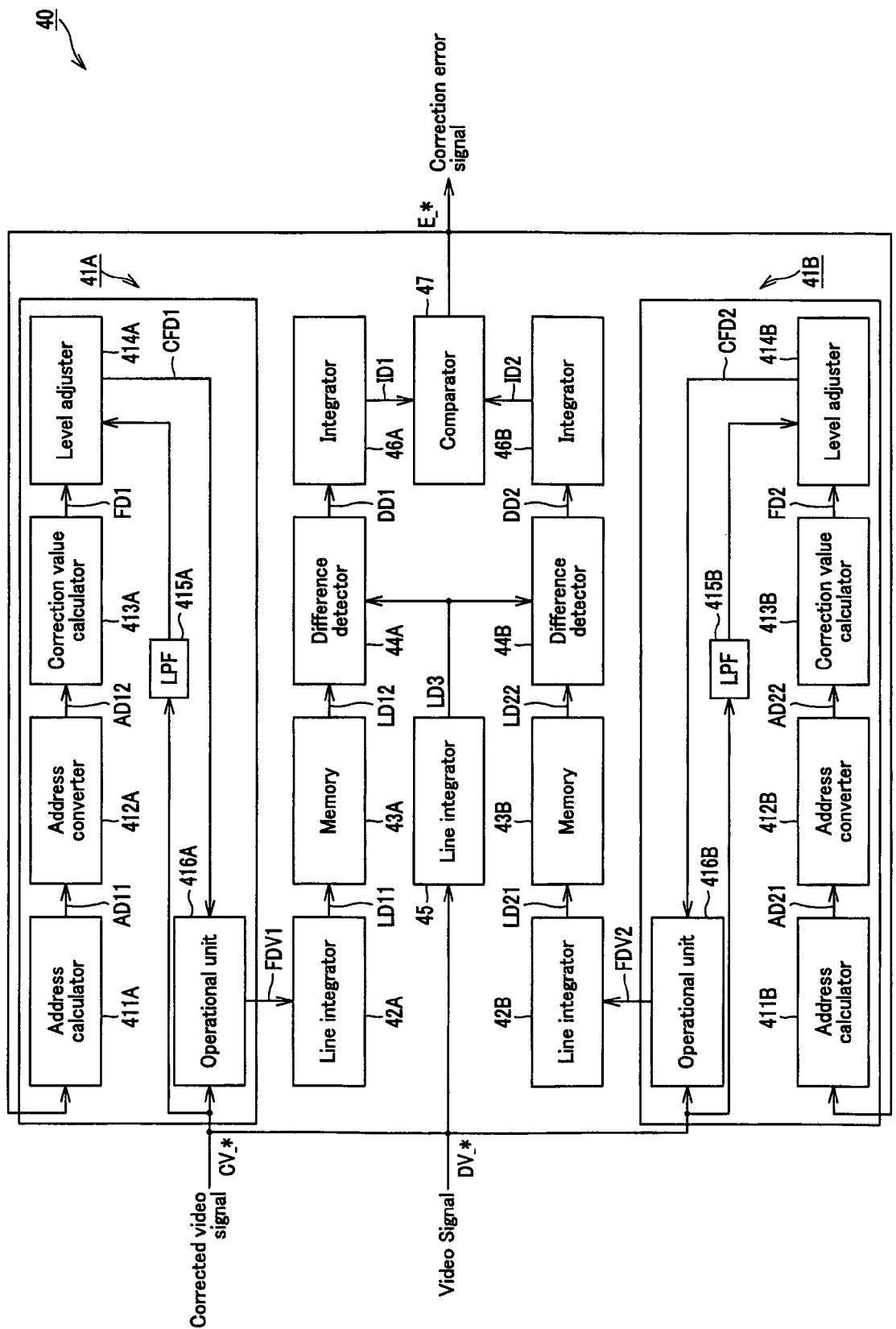
FIG. 10 is a schematic block diagram of a correction error detector included in the image pickup device.

Each of the correction error detectors 40R, 40G and 40B uses a correction error detector 40* constructed as shown in FIG. 10. It should be noted here that the asterisk (*) stands for "R (red)", "G (green)" and "B (blue)".

The correction error detector 40* includes flicker-added signal generators 41A and 41B supplied with an image signal CV_* flicker-corrected by the flicker correction circuit 30*, line integrators 42A and 42B supplied with flicker-added signals FDV1 and FDV2 generated by the flicker-added signal generators 41A and 41B, respectively, memories 43A and 43B supplied with line data LD11 and LD21 integrated by the line integrators 42A and 42B, respectively, difference detectors 44A and 44B supplied with line data LD12 and LD22 read from the memories 43A and 43B, respectively, line integrator 45 supplied with an image signal DV_* digitized by the A-D converter 20*, integrators 46A and 46B supplied with difference data DD1 and DD2 detected by the difference detectors 44A and 44B, respectively, comparator 47 supplied with integrated data ID1 and ID2 provided by the integrators 46A and 46B, respectively, etc. Line data LD3 provided by the line integrator 45 will be supplied to each of the difference detectors 44A and 44B, and a correction error signal E_* provided as a comparison output from the comparator 47 be supplied to each of the flicker-added signal generators 41A and 41B.

Each of the flicker-added signal generators 41A and 41B includes address calculators 411A and 411B supplied with the correction error signal E_* supplied as a comparison output from the comparator 47, address converters 412A and 412B supplied with addresses AD11 and AD21 calculated by the address calculators 411A and 411B, respectively, correction value calculators 413A and 413B supplied with addresses AD12 and AD22 calculated by the address calculators 412A and 412B, respectively, level adjusters 414A and 414B supplied with flicker data FD1 and FD2 calculated by the correction value calculators 413A and 413B, respectively, low-pass filters (LPF) 415A and 415B and operational units 416A and 416B supplied with an image signal DV_* digitized by the A-D converter 20*. The image signal DV_* digitized by the A-D converter 20* will be supplied, via the low-pass filters (LPF) 415A and 415B, to the level adjusters 414A and 414B, and correction values CFD1 and CFD2 generated by the level adjusters 414A and 414B, respectively, are supplied to the operational units 416A and 416B, respectively.

In the correction error detector 40* constructed as above, the address calculators 411A and 411B calculate addresses AD11 and AD21 in the ROM on the basis of the correction error signal E_*. The addresses to be thus calculated are resulted from shifting the top address of a flicker of a next frame in the positive- or negative-going direction. These addresses are calculated as in the address calculator 31* in the flicker correction circuit 30*. Also, the ROM included in the correction error detector 40* is identical to that included in the flicker correction circuit 30*.

The address converters 412A and 412B convert the addresses AD11 and AD21 calculated by the address calculators 411A and 411B, respectively, into addresses AD12 and AD22, respectively, from which flickers of a next frame can be reproduced. That is, they convert the addresses AD1 and AD2 into addresses opposite in phase to the addresses AD1 and AD2. The addresses AD12 and AD22 converted by the address converters 412A and 412B, respectively, are resulted from prediction of flickers of the next frame, but not intended for correction of the flickers.

The correction value calculators 413A and 413B calculate flicker data FD1 and FD2 on the basis of the addresses AD12 and AD22, respectively, converted by the address converters 412A and 412B, respectively. The flicker data FD1 and FD2 are also determined per line as in the flicker correction circuit 30*. The correction value calculators 413A and 413B are similarly constructed to the correction value calculator 32* included in the flicker correction circuit 30*.

Also in the correction value detectors 413A and 413B, the image signal DV_* is passed through low-pass filters (LPF) 415A and 415B as in the flicker correction circuit 30* to remove noises from the image signal DV_*, and the noise-removed image signal DV_* is supplied to the level adjusters 414A and 414B. The level adjusters 414A and 414B calculate correction values CFD1 and CFD2 for each pixel, which is not under the influence of the noise, from the image signal DV_* digitized by the A-D converter 20* and flicker data FD1 and FD2 calculated by the correction value calculators 413A and 413B, respectively.

The level adjusters 414A and 414B are constructed like the level adjuster 33* included in the flicker correction circuit 30*.

The operational units 416A and 416B generate flicker-added signals FDV1 and FDV2 of a next frame from the correction values CFD1 and CFD2 for each pixel and flicker-corrected image signal CV_*.

The line integrators 42A and 42B calculate line data LD11 and LD21 by integrating certain segments of the flicker-added signals FDV1 and FDV2 of the next frame, respectively. The "segment" may be of an arbitrary value as a horizontal size so far as it is within an image acquired horizontally. With a larger segment, a correction error can be detected with a higher accuracy. The vertical size of the segment may be an integral multiple of the cycle of the light and dark fringes of a flicker within one screen. More specifically, the segment may be given a size of 1000 horizontal pixels by 675 vertical pixels (=337.5×2), namely, of 1000× 675 pixels.

The line data LD11 and LD21 calculated by the line integrators 42A and 42B are stored in the memories 43A and 43B, respectively, until the image signal DV_* of a next frame is supplied. When the image signal DV_* of the next frame is supplied, the line integrator 45 makes line integration of the same segments as those of the flicker-added signals FDV1 and FDV2 which have been integrated to calculate the line data LD3.

The line data LD12 and LD22 stored in the memories 43A and 43B, respectively, and line data LD3 of the next-frame image signal DV_* corresponding to the lines of the line data LD12 and LD22 are supplied to the difference detectors 44A and 44B to provide difference data DD1 and DD2.

The integrators 46A and 46B provide integrated data ID1 and ID2, respectively, by integrating the two difference data DD1 and DD2, respectively.

Then, the comparator 47 judges, by making a comparison in size between these integrated data ID1 and ID2, in which direction an address is shifted for prediction of a correct flicker, positive- or negative-going. For example, in case the integrated data ID* obtained with the address shifted in the positive-going direction is smaller than the integrated data ID* obtained with the address shifted in the negative-going direction, a correction error signal E_* is outputted to shift the address in the positive-going direction.

The correction error is minimized by supplying the correction error signal E_* to the address calculator 31 of the flicker correction circuit 30* and 411A and 411B of the correction error detector 40* to shift the address in a correct direction toward a flicker.

It should be understood by those skilled in the art that various modifications, combinations, sub-combinations and alterations may occur depending on design requirements and other factors insofar as they are within the scope of the appended claims or the equivalents thereof.

What is claimed is:

1. A flicker correction method for causing a flicker correction device to correct an image flicker by subtracting a flicker correction signal from an uncorrected image signal, the method comprising:
   removing, in a low-pass filter, noise from a flicker-corrected image signal;
   generating, in a correction error detection circuit, a correction error signal from the noise-removed, flicker-corrected image signal and the uncorrected image signal;
   removing, in a second low-pass filter, noise from the uncorrected image signal; and
   generating, in a flicker correction circuit, a flicker correction signal from the noise-removed uncorrected image signal and the correction error signal.

2. The method according to claim 1, further comprising:
   calculating a flicker location in the uncorrected image signal based on an image frame rate, a power supply frequency and the correction error signal; and
   calculating a flicker correction value based on the flicker location,
   wherein the flicker correction signal is based on the noise-removed uncorrected image signal and the flicker correction value.

3. The method according to claim 2, wherein calculating the flicker correction value includes adding a product of a first flicker data with the image frame rate and a second flicker data with a shutter speed, the first and second flicker data corresponding to the flicker location.

4. A flicker correction device in which a flicker is corrected by subtracting a flicker correction signal from an uncorrected image signal, the device comprising:
   means for removing noise from a flicker-corrected image signal;
   means for generating a correction error signal from the noise-removed, flicker-corrected image signal and the uncorrected image signal;
   means for removing noise from the uncorrected image signal; and
   means for generating a flicker correction signal from the noise-removed uncorrected image signal and the correction error signal.

5. The flicker correction device according to claim 4, further comprising:
   means for determining a flicker location within the uncorrected image signal based on an image frame rate, a power supply frequency and the correction error signal; and
   means for determining a flicker correction value based on the flicker location,
   wherein the flicker correction signal is based on the noise-removed uncorrected image signal and the flicker correction value.

6. The flicker correction device according to claim 5, wherein the flicker correction value is determined in accordance with a sum of a product of a first flicker data with the image frame rate and a product of a second flicker data with a shutter speed, the first and second image data corresponding to the flicker location.

7. An image pickup device including a flicker correction device in which a flicker is corrected by subtracting a flicker correction signal from an uncorrected image signal captured by an image sensor, the flicker correction device comprising:
- means for removing noise from a flicker-corrected image signal
- means for generating a correction error signal from the noise-removed, flicker-corrected image signal and the uncorrected image signal;
- means for removing noise from the uncorrected image signal; and
- means for generating a flicker correction signal from the noise-removed uncorrected image signal and the correction error signal.

8. The image pickup device including the flicker correction device according to claim 7, wherein the flicker correction device further includes,
- means for determining a flicker location within the uncorrected image signal based on an image frame rate, a power supply frequency and the correction error signal; and
- means for determining a flicker correction value based on the flicker location,
- wherein the flicker correction signal is based on the noise-removed uncorrected image signal and the flicker correction value.

9. The image pickup device according to claim 8, wherein the flicker correction value is determined in accordance with a sum of a product of a first flicker data with the image frame rate and a product of a second flicker data with a shutter speed, the first and second image data corresponding to the flicker location.

10. A flicker correction device in which a flicker is corrected by subtracting a flicker correction signal from an uncorrected image signal, the device comprising:
- a correction error detector configured to remove noise from a flicker-corrected image signal using a low-pass filter and configured to generate a correction error signal from the noise-removed, flicker-corrected image signal and the uncorrected image signal; and
- a flicker correcting unit configured to remove noise from the uncorrected image signal using a low-pass filter and configured to generate a flicker correction signal from the noise-removed uncorrected image signal and the correction error signal.

11. The flicker correction device according to claim 10, wherein the flicker correcting unit includes,
- an location unit configured to determine a flicker location within the uncorrected image signal in accordance with an image frame rate, a power supply frequency and the correction error signal, and
- a correction unit configured to determine a flicker correction value based on the flicker location, the flicker correction signal being based on the noise-removed uncorrected signal and the flicker correction value.

12. The flicker correction device according to claim 11, wherein the flicker correction value is determined in accordance with a sum of a product of a first flicker data with the image frame rate and a product of a second flicker data with a shutter speed, the first and second image data corresponding to the flicker location.

13. An image pickup device including a flicker correction device in which a flicker is corrected by subtracting a flicker correction signal from an uncorrected image signal captured by an image sensing device, the flicker correction device comprising:
- a correction error detector configured to remove noise from a flicker-corrected image signal using a low-pass filter and configured to generate a correction error signal from the noise-removed, flicker-corrected image signal and the uncorrected image signal; and
- a flicker correcting unit configured to remove noise from the uncorrected image signal using a low-pass filter and configured to generate a flicker correction signal from the noise-removed uncorrected image signal and the correction error signal.

14. The image pickup device according to claim 13, wherein the flicker correcting unit includes,
- an location unit configured to determine a flicker location within the uncorrected image signal in accordance with an image frame rate, a power supply frequency and the correction error signal, and
- a correction unit configured to determine a flicker correction value based on the flicker location, the flicker correction signal being based on the noise-removed uncorrected signal and the flicker correction value.

15. The image pickup device according to claim 14, wherein the flicker correction value is determined in accordance with a sum of a product of a first flicker data with the image frame rate and a product of a second flicker data with a shutter speed, the first and second image data corresponding to the flicker location.

* * * * *